United States Patent
Mori et al.

(10) Patent No.: US 9,291,121 B2
(45) Date of Patent: Mar. 22, 2016

(54) CYLINDER HEAD GASKET

(71) Applicants: Shingo Mori, Toyota (JP); Tomoaki Matsubara, Toyota (JP); Ryosuke Fujiki, Toyota (JP)

(72) Inventors: Shingo Mori, Toyota (JP); Tomoaki Matsubara, Toyota (JP); Ryosuke Fujiki, Toyota (JP)

(73) Assignee: NIPPON GASKET CO., LTD., Toyota-shi, Aichi (JP)

( * ) Notice: Subject to any disclaimer, the term of this patent is extended or adjusted under 35 U.S.C. 154(b) by 224 days.

(21) Appl. No.: 14/073,032

(22) Filed: Nov. 6, 2013

(65) Prior Publication Data

US 2014/0062033 A1    Mar. 6, 2014

Related U.S. Application Data

(62) Division of application No. 12/733,419, filed as application No. PCT/JP2008/065738 on Sep. 2, 2008, now Pat. No. 8,608,178.

(30) Foreign Application Priority Data

Sep. 12, 2007  (JP) .................... 2007-236956

(51) Int. Cl.
*F02F 11/00* (2006.01)
*F16J 15/08* (2006.01)

(52) U.S. Cl.
CPC .............. *F02F 11/002* (2013.01); *F02F 11/00* (2013.01); *F16J 15/0825* (2013.01); *F16J 2015/085* (2013.01); *F16J 2015/0868* (2013.01); *F16J 2015/0875* (2013.01)

(58) Field of Classification Search
CPC .............. F16J 15/0818; F16J 2015/085; F16J 2015/0875

See application file for complete search history.

(56) References Cited

U.S. PATENT DOCUMENTS

| | | | |
|---|---|---|---|
| 5,378,001 A | 1/1995 | Miyaoh | |
| 5,472,217 A * | 12/1995 | Hagiwara et al. | 277/596 |
| 5,628,518 A | 5/1997 | Ushio et al. | |
| 5,669,615 A * | 9/1997 | Hohe et al. | 277/595 |
| 5,791,659 A | 8/1998 | Takada et al. | |
| 6,131,915 A * | 10/2000 | Nicholson | 277/593 |
| 6,168,167 B1 | 1/2001 | Aoki | |
| 2003/0075873 A1 | 4/2003 | Nakamura | |
| 2004/0212155 A1* | 10/2004 | Foster | 277/593 |
| 2005/0077687 A1* | 4/2005 | Kinoshita | 277/592 |
| 2005/0093247 A1* | 5/2005 | Udagawa | 277/593 |
| 2006/0119050 A1 | 6/2006 | Tripathy et al. | |

(Continued)

FOREIGN PATENT DOCUMENTS

| | | |
|---|---|---|
| JP | 1-60074 | 4/1989 |
| JP | 05-001771 | 1/1993 |

(Continued)

*Primary Examiner* — Vishal Patel

(74) *Attorney, Agent, or Firm* — Flynn, Thiel, Boutell & Tanis, P.C.

(57) ABSTRACT

A cylinder head gasket includes a plurality of seal plates 1 to 4 so that a combustion gas that leaks through a gap between the respective seal plates is reliably sealed. The cylinder head gasket includes the plurality of seal plates 1 to 4, which are held between a cylinder head and a cylinder block having a cylinder bore. The plurality of seal plates 1 to 4 are adhered to each other in a circumferentially continuous manner around combustion chamber holes 1a to 4a, and the combustion gas that leaks through the gap between the respective seal plates is reliably sealed within an adhered portion 5 of the respective seal plates.

1 Claim, 3 Drawing Sheets

(56) References Cited

U.S. PATENT DOCUMENTS

| | | |
|---|---|---|
| 2006/0290071 A1 | 12/2006 | Klinner |
| 2007/0158918 A1 | 7/2007 | Belter |
| 2008/0042371 A1* | 2/2008 | Flemming .................... 277/593 |
| 2008/0164659 A1 | 7/2008 | Kinoshita |
| 2008/0185791 A1 | 8/2008 | Schmitt et al. |
| 2009/0184478 A1 | 7/2009 | Imai |
| 2009/0189359 A1 | 7/2009 | Yoshijima et al. |
| 2011/0079964 A1 | 4/2011 | Swasey et al. |

FOREIGN PATENT DOCUMENTS

| | | |
|---|---|---|
| JP | 08-105544 | 4/1996 |
| JP | 2000-088105 | 3/2000 |
| JP | 2002-054502 | 2/2002 |
| JP | 2004-278710 | 10/2004 |
| JP | 2005-133789 | 5/2005 |

* cited by examiner

CYLINDER HEAD GASKET

CROSS-REFERENCE TO RELATED APPLICATIONS

This is a division of Ser. No. 12/733,419, filed Feb. 26, 2010, which was the national stage of International Application No. PCT/JP2008/065738, filed Sep. 2, 2008, which International Application was not published in English.

TECHNICAL FIELD

The present invention relates to a cylinder head gasket, and more particularly, to a cylinder head gasket adapted to seal a gap between a cylinder head and a cylinder block by use of a self sealing effect.

BACKGROUND ART

There has been generally known a cylinder head gasket held between a cylinder head and a cylinder block having a cylinder bore, and including a plurality of seal plates each having a combustion chamber hole formed at the position of the cylinder bore.

A cylinder head gasket adapted to seal a gap between a cylinder head and a cylinder block by use of a self sealing effect is known as this type of cylinder head gasket (Patent Document 1).

To be more specific, in the cylinder head gasket according to Patent Document 1, a projecting portion that projects toward the cylinder head around the combustion chamber hole is formed on a seal plate on the cylinder head side, and a radial center portion of the projecting portion is formed projecting toward the cylinder block. Also, a projecting portion that projects toward the cylinder block around the combustion chamber hole is formed on a seal plate on the cylinder block side, and a radial center portion of the projecting portion is formed projecting toward the cylinder head. The seal plates overlap each other such that the radial center portions of the both projecting portions are brought into close contact with each other in a circumferentially continuous manner.

Since the radial center portions of the projecting portions are in close contact with each other in a circumferentially continuous manner in the cylinder head gasket having the aforementioned configuration, a combustion gas to be blown out through a gap between the radial center portions presses one of the projecting portions toward the cylinder head, and also presses the other projecting portion toward the cylinder block by its pressure.

When one of the projecting portions is pressed against the cylinder head by the pressure of the combustion gas, the sealability of the pressed portion is improved. When the other projecting portion is pressed against the cylinder block by the pressure of the combustion gas, the sealability of the pressed portion is also improved.

Moreover, when one of the projecting portions is pressed against the cylinder head and the other projecting portion is pressed against the cylinder block, the radial center portion of one of the projecting portions and the radial center portion of the other projecting portion are brought into closer contact with each other by the reactions. Thus, the sealability of the portion is also improved.

That is, with the cylinder head gasket according to Patent Document 1, a good sealing effect can be obtained from the self sealing effect by use of the pressure of the combustion gas.

Patent Document 1: Japanese Patent Laid-Open No. 2000-88105

DISCLOSURE OF THE INVENTION

Problems to be Solved by the Invention

However, the conventional cylinder head gasket has a problem that its configuration is complicated since it is necessary to form the projecting portion on each of the seal plate on the cylinder head side and the seal plate on the cylinder block side, and bring the respective radial center portions of the projecting portions into close contact with each other in a circumferentially continuous manner.

Particularly, the combustion gas that leaks through the gap between the seal plates needs to be sealed by bringing the radial center portions of the projecting portions into close contact with each other in a circumferentially continuous manner, and it is thus necessary to accurately manufacture the seal plates for the purpose of bringing the center portions into close contact with each other in a circumferentially continuous manner. Accordingly, there is a disadvantage that the cost is increased.

The present invention has been made in view of such circumstances, and it is an object of the present invention to provide a cylinder head gasket capable of reliably sealing a combustion gas that leaks through a gap between a plurality of seal plates with a simple configuration.

Means for Solving the Problems

That is, in the present invention, a cylinder head gasket is held between a cylinder head and a cylinder block having a cylinder bore, and including a plurality of seal plates each having a combustion chamber hole formed at a position of the cylinder bore, wherein the plurality of seal plates are adhered to each other in a circumferentially continuous manner around the combustion chamber holes, and a combustion gas that leaks through a gap between the respective seal plates is sealed within an adhered portion of the respective seal plates.

The invention also is the previous invention, wherein the plurality of seal plates include two seal plates; a first seal plate and a second seal plate, the first seal plate and the second seal plate being adhered to each other in a circumferentially continuous manner around the combustion chamber holes.

The invention also is the previous invention, wherein a third seal plate is provided between the first seal plate and the second seal plate, the first seal plate and the third seal plate being adhered to each other in a circumferentially continuous manner around the combustion chamber holes, and the third seal plate and the second seal plate being adhered to each other in a circumferentially continuous manner around the combustion chamber holes.

The invention also is the previous invention, wherein a third seal plate formed into a ring shape around the combustion chamber hole is provided between the first seal plate and the second seal plate, an intermediate plate held between the first seal plate and the second seal plate is provided on an opposite side of the third seal plate from the combustion chamber hole, and a fourth seal plate having a ring shape around the combustion chamber hole is provided between the first seal plate and the third seal plate, the fourth seal plate being bent at an intermediate portion such that a radial outer portion of the fourth seal plate is held between the intermediate plate and the second seal plate bypassing between the third seal plate and the intermediate plate and extending to a gap between the intermediate plate and the second seal plate, the first seal plate and the fourth seal plate being adhered to each other in a circumferentially continuous manner around the combustion chamber holes, and the fourth seal plate and the second seal plate being adhered to each other in a circumferentially continuous manner around the combustion chamber holes.

The invention also is the previous invention, wherein a fourth seal plate having a ring shape around the combustion chamber hole is provided between the first seal plate and the third seal plate, the first seal plate and the fourth seal plate being adhered to each other in a circumferentially continuous manner around the combustion chamber holes, the fourth seal plate and the third seal plate being adhered to each other in a circumferentially continuous manner around the combustion chamber holes, and the third seal plate and the second seal plate being adhered to each other in a circumferentially continuous manner around the combustion chamber holes.

Advantages of the Invention

With any one of the aforementioned inventions, the combustion gas that leaks through the gap between the respective seal plates is sealed within the adhered portion. Thus, the leakage of the combustion gas from the portion can be reliably prevented. The combustion gas prevented from leaking by the adhered portion presses the seal plate on the cylinder head side against the cylinder head, and the seal plate on the cylinder block side against the cylinder block, respectively. The sealability of each of the pressed portions can be thereby improved. Accordingly, with the present invention, a good sealing effect can be obtained from a self sealing effect by use of the pressure of the combustion gas.

By adhering the seal plates to each other in a circumferentially continuous manner around the combustion chamber holes, the cylinder head gasket can be manufactured more easily at a lower cost in comparison with a case of employing the aforementioned conventional configuration.

| Description of Symbols | | | |
|---|---|---|---|
| 1 | First seal plate | 2 | Second seal plate |
| 3 | Third seal plate | 4 | Fourth seal plate |
| 1a to 4a | Combustion chamber hole | 1b, 2b | Full bead |
| 1c, 2c | Quarter bead | 5 | Adhered portion |
| 11 | Intermediate plate | 11a | Through hole |
| 12 | Coupling means | | |

BEST MODE FOR CARRYING OUT THE INVENTION

Figure 1:
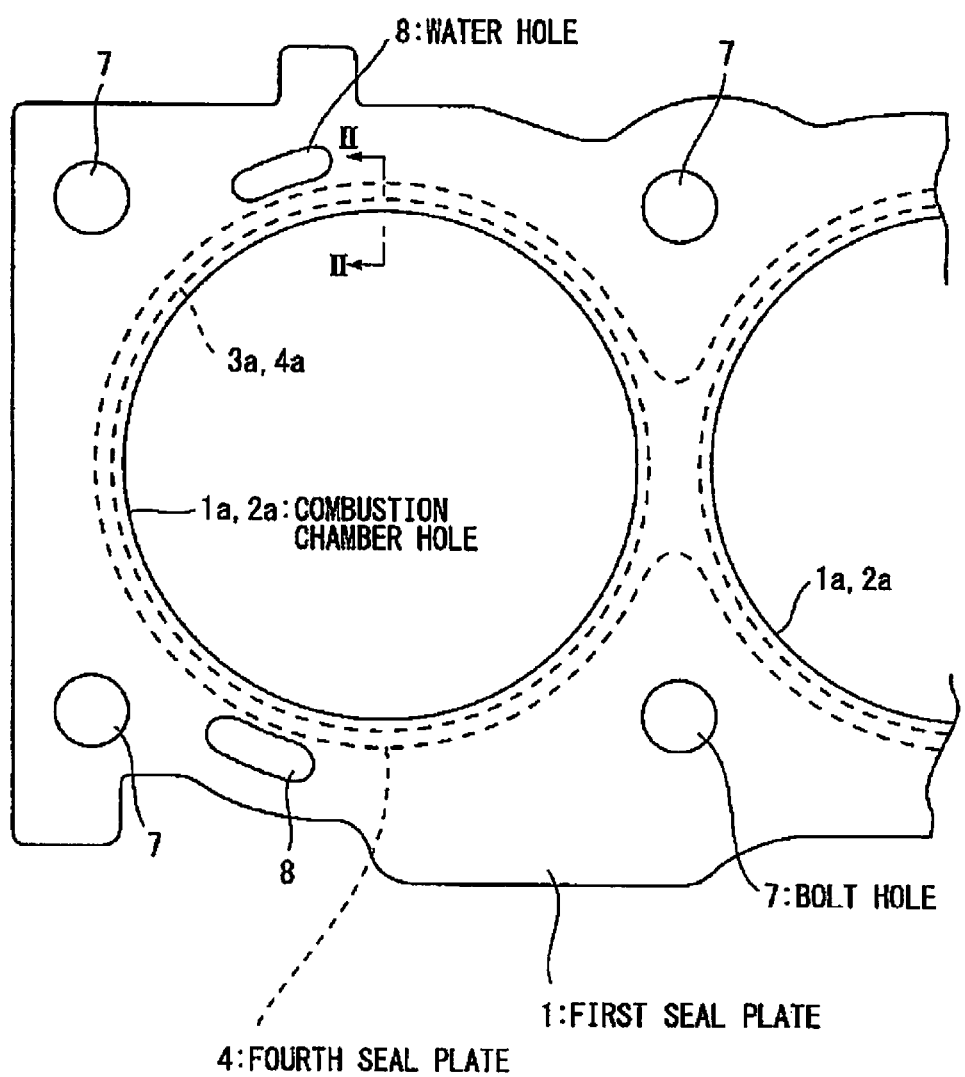
FIG. 1 is a plan view illustrating a first embodiment according to the present invention.
Figure 2:
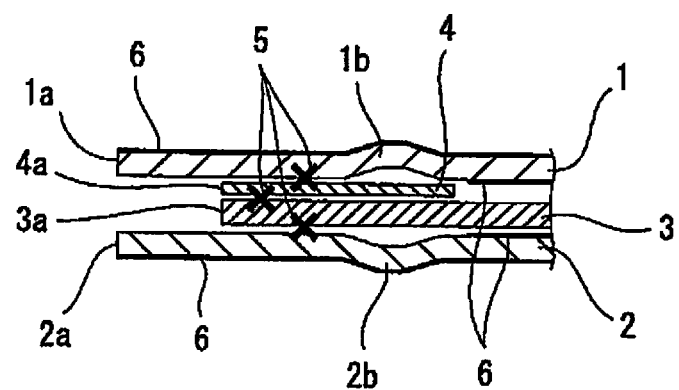
FIG. 2 is a sectional view taken along a line II-II in FIG. 1.

In the following, the present invention will be described with reference to embodiments shown in the drawings. In FIGS. 1 and 2, a cylinder head gasket according to a present embodiment includes four seal plates 1, 2, 3 and 4, which overlap with each other. The cylinder head gasket is held between a cylinder head and a cylinder block which are not shown in the drawings, to thereby seal a gap between the cylinder head and the cylinder block.

Out of the four seal plates 1 to 4, the top first seal plate 1 brought into abutment against the unillustrated cylinder head and the bottom second seal plate 2 brought into abutment against the unillustrated cylinder block are formed into substantially the same shape. The first and second seal plates 1 and 2 respectively include a plurality of combustion chamber holes 1a and 2a formed corresponding to cylinder bores of the cylinder block. The inner diameter of each of the combustion chamber holes 1a and 2a is substantially the same as the inner diameter of each of the cylinder bores.

The third seal plate 3 overlapped on the bottom second seal plate 2 includes a plurality of combustion chamber holes 3a formed corresponding to the positions of the cylinder bores of the cylinder block. The inner diameter of each of the combustion chamber holes 3a is set to be larger than the inner diameter of each of the combustion chamber holes 1a and 2a.

The third seal plate 3 is formed into substantially the same shape as the two seal plates 1 and 2 except that the inner diameter of each of the combustion chamber holes 3a is set to be larger than those of the two seal plates 1 and 2.

The fourth seal plate 4 arranged between the top first seal plate 1 and the third seal plate 3 is formed into a ring shape so as to surround a combustion chamber hole 4a, and is arranged with respect to each of the cylinder bores. In the embodiment shown in the drawings, the ring-shaped fourth seal plates 4 arranged with respect to the respective cylinder bores are integrally coupled to each other between the respective cylinder bores. The assembling facility is thereby improved (see FIG. 1). However, the fourth seal plates 4 may be also manufactured separately from each other.

The inner diameter of the combustion chamber hole 4a formed in the fourth seal plate 4 is matched to the inner diameter of each of the combustion chamber holes 3a of the third seal plate 3. The combustion chamber holes 1a to 4a are respectively disposed such that their centers are aligned with the center axis of each of the cylinder bores.

Full beads 1b and 2b are formed respectively in the top first seal plate 1 and the bottom second seal plate 2 within a range overlapped with the ring-shaped fourth seal plate 4. The full bead 1b formed in the top first seal plate 1 in abutment against the cylinder head is formed projecting toward the cylinder head.

Meanwhile, the full bead 2b formed in the bottom second seal plate 2 in abutment against the cylinder block is formed projecting toward the cylinder block.

Each of the full beads 1b and 2b is formed so as to surround each of the combustion chamber holes 1a and 2a in an endless pattern.

The four seal plates 1 to 4 are circumferentially continuous around the combustion chamber holes 1a to 4a, and are adhered to each other at an outer position apart from the inner rim of each of the combustion chamber holes. Accordingly, a combustion gas that leaks through a gap between the respective seal plates can be sealed within an adhered portion 5 thereof.

That is, the first seal plate 1 and the fourth seal plate 4 are adhered to each other in a circumferentially continuous manner around the combustion chamber holes 1a and 4a. The fourth seal plate 4 and the third seal plate 3 are also adhered to each other in a circumferentially continuous manner around the combustion chamber holes 4a and 3a. Furthermore, the third seal plate 3 and the second seal plate 2 are adhered to each other in a circumferentially continuous manner around the combustion chamber holes 3a and 2a.

As means for adhering the respective seal plates 1 to 4, welding by laser welding can be employed. Alternatively, bonding with a polyimide or inorganic adhesive having heat resistance may be also employed. In any case, any means may be employed as long as the combustion gas that leaks through the gap between the respective seal plates can be sealed within the adhered portion 5. Thus, especially when an adhesive is used, the entire surface of a portion on the outer side from the adhered portion 5 that is at the outer position apart from the inner rim of the combustion chamber hole may be bonded with the adhesive.

A coating material 6 such as a fluoric or nitrile rubber or elastomeric material is coated on the surface of the top first seal plate 1, that is, the contact surface with the cylinder head. The similar coating material 6 is also coated on the surface of the bottom second seal plate 1, that is, the contact surface with the cylinder block.

The coating material 6 is also coated on the contact surface between the first seal plate 1 and the third seal plate 3, and the contact surface between the third seal plate 3 and the second seal plate 2, respectively.

The coating material 6 is provided for the purpose of improving the adhesiveness and sealability with the partner material. A top coat such as graphite and wax may be further applied to the surface of the coating material 6 to ensure slidability and non-viscosity, if necessary.

As shown in FIG. 1, a plurality of bolt holes 7 through which unillustrated fastening bolts are inserted and water holes 8 through which cooling water flows are formed respectively in the seal plates 1 to 3 excluding the fourth seal plate 4 that is formed into a ring shape with respect to each of the combustion chamber holes 4a. Although not shown in the drawings, an oil hole through which lubricant oil flows is also provided in the seal plates 1 to 3.

With the aforementioned configuration, the combustion gas that leaks through the gap between the first seal plate 1 and the fourth seal plate 4 is sealed within the adhered portion 5 for adhering the seal plates 1 and 4 to each other in an endless pattern. It is thus possible to reliably prevent the leakage of the combustion gas from the portion. Similarly, the combustion gas that leaks through the gap between the fourth seal plate 4 and the third seal plate 3 is sealed within the adhered portion 5 between the seal plates 4 and 3. Furthermore, the combustion gas that leaks through the gap between the third seal plate 3 and the second seal plate 2 is sealed within the adhered portion 5 between the seal plates 3 and 2. That is, the combustion gas cannot leak through the gaps between the respective seal plates 1 to 4.

The combustion gas prevented from leaking by the respective adhered portions 5 acts to increase the gaps between the respective seal plates 1 to 4. Thus, the combustion gas presses the first seal plate 1 on the cylinder head side against the cylinder head, and the second seal plate 2 on the cylinder block side against the cylinder block, respectively. As a result, the first seal plate 1 is strongly pressed against the cylinder head, and the second seal plate 2 is strongly pressed against the cylinder block, so that the sealability of each of the pressed portions can be improved.

Particularly, in the present embodiment, the inner diameters of the combustion chamber holes 2a and 3a in the intermediate seal plates 2 and 3 held between the top and bottom seal plates 1 and 2 are set to be larger than the inner diameters of the combustion chamber holes 1a and 2a in the top and bottom seal plates 1 and 2. Therefore, the pressure of the combustion gas easily acts on portions of the top and bottom seal plates 1 and 2 adjacent to the combustion chamber holes 2a and 3a.

As a result, the portions are effectively pressed against and brought into close contact with the cylinder head and the cylinder block. The sealability of the portions can be thereby improved.

Figure 3:
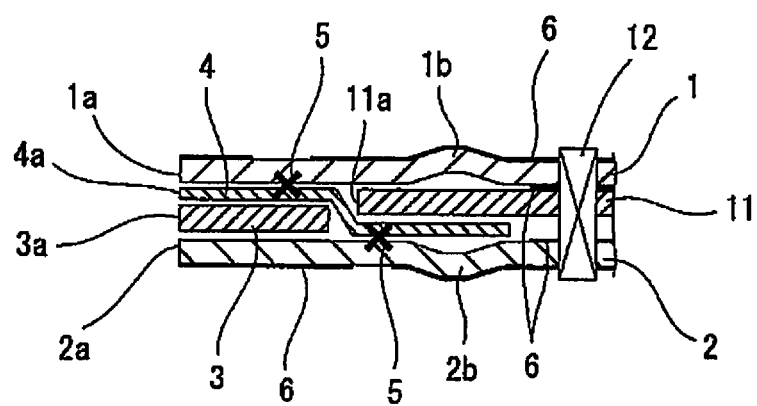
FIG. 3 is a sectional view illustrating a second embodiment according to the present invention.

FIG. 3 shows another embodiment according to the present invention. In the present embodiment, the number of the adhered portions is reduced in comparison with the aforementioned embodiment.

To be more specific, in the present embodiment, the third seal plate 3 arranged between the first seal plate 1 and the second seal plate 2 is formed into a smaller ring shape than the fourth seal plate 4 having a ring shape around the combustion chamber hole 4a. The third seal plate 3 is independently provided with respect to each of the cylinder bores. The respective third seal plates 3 are not coupled together between the cylinder bores.

An intermediate plate 11 held between the first seal plate 1 and the second seal plate 2 is provided on the opposite side of the third seal plate 3 from the combustion chamber hole 3a with a predetermined distance therebetween. That is, the intermediate plate 11 has a plurality of through holes 11a each surrounding the third seal plate 3 arranged with respect to each of the cylinder bores. An outer portion of the seal plate 3 from the through holes 11a is formed into substantially the same shape as those of the two seal plates 1 and 2.

In the present embodiment, the thickness of the third seal plate 3 is set to be the same as that of the intermediate plate 11.

Furthermore, the fourth seal plate 4 formed into a ring shape so as to surround the combustion chamber hole 4a has its radial intermediate portion bent from up to down into a step shape. The bent portion is disposed so as to pass between the third seal plate 3 and the intermediate plate 11 such that a radial inner portion from the bent portion is arranged between the first seal plate 1 and the third seal plate 3 and is thereby held therebetween, and a radial outer portion from the bent portion is arranged between the intermediate plate 11 and the second seal plate 2 and is thereby held therebetween.

The first seal plate 1 and the fourth seal plate 4 are adhered to each other in a circumferentially continuous manner around the combustion chamber holes 1a and 4a. The fourth seal plate 4 and the second seal plate 2 are adhered to each other in a circumferentially continuous manner around the combustion chamber holes 4a and 2a.

Moreover, in the present embodiment, the intermediate plate 11 is integrally coupled to at least one of the first seal plate 1 and the second seal plate 2 by coupling means 12 such as caulking and riveting.

In the present embodiment, the inner diameter of each of the combustion chamber holes 2a to 4a is formed to be substantially the same as the inner diameter of each of the cylinder bores unlike the aforementioned first embodiment. Other components are configured similarly to those of the first embodiment.

With the present embodiment having the aforementioned configuration, only the two adhered portions are required while the three adhered portions are required in the aforementioned first embodiment. The combustion gas that leaks through the gaps between the respective seal plates 1 to 4 can be reliably sealed by using the two adhered portions 5.

Figure 4:
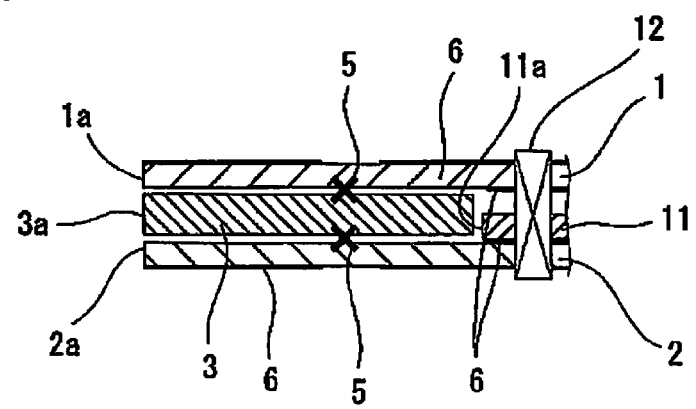
FIG. 4 is a sectional view illustrating a third embodiment according to the present invention.

FIG. 4 shows a third embodiment according to the present invention. The configuration is further simplified in the present embodiment.

To be more specific, in the present embodiment, the fourth seal plate 4 in the second embodiment shown in FIG. 3 is omitted. The first seal plate 1 and the third seal plate 3 are adhered to each other in a circumferentially continuous manner around the combustion chamber holes 1*a* and 3*a*. The third seal plate 3 and the second seal plate 2 are adhered to each other in a circumferentially continuous manner around the combustion chamber holes 3*a* and 2*a*.

Also, the third seal plate 3 is formed thicker than the intermediate plate 11, so that a surface pressure around the periphery of the cylinder bore can be increased. In the present embodiment, the full beads 1*b* and 1*a* formed in the first seal plate 1 and the second seal plate 2 are further omitted.

The components other than those described above are configured similarly to those of the second embodiment.

Accordingly, with the present embodiment, good sealability can be ensured by the adhered portions 5, and the cylinder head gasket can be manufactured at a lower cost with the simple configuration.

Figure 5:
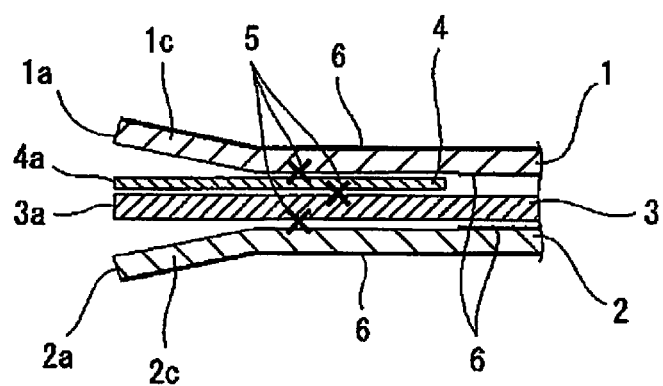
FIG. 5 is a sectional view illustrating a fourth embodiment according to the present invention.

FIG. 5 shows a fourth embodiment according to the present invention. In the present embodiment, a quarter bead 1*c* is formed projecting in a conical shape toward the cylinder head in an inner portion from the adhered portion 5 in the first seal plate 1 in contact with the cylinder head, and a quarter bead 2*c* is formed projecting in a conical shape toward the cylinder block in an inner portion from the adhered portion 5 in the second seal plate 2 in contact with the cylinder block.

In the present embodiment, the third seal plate 3 formed into substantially the same shape as those of the two seal plates 1 and 2, and the fourth seal plate 4 formed into a ring shape so as to surround the combustion chamber hole 4*a* are also arranged between the two seal plates 1 and 2. The four seal plates 1 to 4 are adhered to each other in a circumferentially continuous manner respectively around the combustion chamber holes 1*a* to 4*a*.

In the present embodiment, the combustion gas prevented from leaking by the respective adhered portions 5 also acts to increase the gaps between the respective seal plates 1 to 4. In the present embodiment, particularly, since the quarter beads 1*c* and 2*c* are formed respectively in the first seal plate 1 on the cylinder head side and the second seal plate 2 on the cylinder block side, the quarter beads 1*c* and 2*c* are pressed against the cylinder head or the cylinder head in a more preferable manner. Accordingly, the sealability of each of the pressed portions can be further improved.

Of course, the respective quarter beads 1*c* and 2*c* can be applied to the first seal plate 1 and the second seal plate 2 in all the embodiments.

To manufacture the cylinder head gasket at a lower cost, the cylinder head gasket may include only the two seal plates; the first seal plate 1 and the second seal plate 2, although not shown in the drawings. In this case, the first seal plate 1 and the second seal plate 2 may be adhered to each other in a circumferentially continuous manner around the combustion chamber holes 1*a* and 2*a*.

Alternatively, the cylinder head gasket may include the first seal plate 1, the second seal plate 2, and the third seal plate 3 arranged between the seal plates 1 and 2 as described in the first embodiment. In this case, the first seal plate 1 and the third seal plate 3 may be adhered to each other in a circumferentially continuous manner around the combustion chamber holes 1*a* and 3*a*, and the third seal plate 3 and the second seal plate 2 may be adhered to each other in a circumferentially continuous manner around the combustion chamber holes 3*a* and 2*a*.

In the aforementioned respective embodiments, the inner diameters of the combustion chamber holes may be set to be the same as or different from each other, and the full beads may be provided or omitted with reference to the aforementioned embodiments, if necessary.

Furthermore, more seal plates may be laminated. In this case, any number of seal plates may be laminated as long as the combustion gas that leaks through the gap between the respective seal plates can be sealed within each of the plurality of adhered portions, basically.

What is claimed is:

1. A cylinder head gasket held between a cylinder head and a cylinder block having a cylinder bore, and comprising a plurality of seal plates each having a combustion chamber hole formed at a position of the cylinder bore,
    wherein the plurality of seal plates comprise a first seal plate, a second seal plate, a third seal plate provided between the first and second seal plates, and a fourth seal plate provided between the first and third seal plates and formed into a ring shape around the combustion chamber hole,
    the combustion chamber holes formed in the third and fourth seal plates have a larger diameter than the combustion chamber holes formed in the first and second seal plates,
    the first and fourth seal plates are adhered to each other in a circumferentially continuous manner around the combustion chamber holes, the fourth and third seal plates are adhered to each other in a circumferentially continuous manner around the combustion chamber holes, and the third and second seal plates are adhered to each other in a circumferentially continuous manner around the combustion chamber holes,
    a full bead is formed projecting toward the cylinder head in one of the first and second seal plates in abutment against the cylinder head in a circumferentially continuous manner around the combustion chamber hole,
    a full bead is formed projecting toward the cylinder block in other of the first and second seal plates in abutment against the cylinder block in a circumferentially continuous manner around the combustion chamber hole, and
    both of the full beads are provided within a range overlapping with the fourth seal plate and formed outside of the adhered positions of the plurality of seal plates.

* * * * *